US012737331B2

(12) United States Patent
Patel et al.

(10) Patent No.: US 12,737,331 B2
(45) Date of Patent: Sep. 15, 2026

(54) DYNAMIC DATA STRUCTURES FOR COORDINATING BUCKET OPERATIONS

(71) Applicant: Nutanix, Inc., San Jose, CA (US)

(72) Inventors: Arth Patel, Bengaluru (IN); Dheer Moghe, Bengaluru (IN); Sajal Jindal, Bengaluru (IN)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 19/090,351

(22) Filed: Mar. 25, 2025

(65) Prior Publication Data

US 2026/0228191 A1 Aug. 6, 2026

(30) Foreign Application Priority Data

Feb. 6, 2025 (IN) ............................ 202541009778

(51) Int. Cl.
*G06F 16/21* (2019.01)

(52) U.S. Cl.
CPC .......... *G06F 16/214* (2019.01); *G06F 16/211* (2019.01)

(58) Field of Classification Search
CPC .................................................... G06F 16/214
USPC ......................................................... 707/626
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
8,863,124 B1 10/2014 Aron
9,009,106 B1 4/2015 Aron et al.
9,069,708 B2 6/2015 Gill et al.
9,336,132 B1 5/2016 Aron et al.
9,652,265 B1 5/2017 Narayanasamy et al.
9,727,627 B2 8/2017 Pinkney et al.
9,772,866 B1 9/2017 Aron et al.
11,016,944 B2 5/2021 Avati et al.
2017/0249101 A1* 8/2017 Sofia .................... G06F 3/0656
2023/0031079 A1 2/2023 Kaushik et al.
2023/0393927 A1 12/2023 Karr et al.

(Continued)

FOREIGN PATENT DOCUMENTS

CN 104081324 A * 10/2014 ............... G06F 3/14
WO WO-2024020165 A1 * 1/2024 ......... G06F 21/6263

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Syling Yen
(74) *Attorney, Agent, or Firm* — Foley & Lardner LLP

(57) ABSTRACT

Systems and methods for scalable tracking of objects to be replicated are disclosed. A method may include in a first time period, updating, by one or more processors, a data structure with metadata of a received object to be replicated, wherein the data structure includes a plurality of classifications of objects to be replicated based on when the objects were received, in a second time period, after the first time period, updating, by the one or more processors, the data structure to modify a classification of the object based on the object being received in the first time period, and replicating, by the one or more processors, the object based on the modified classification of the object.

24 Claims, 7 Drawing Sheets

(56) References Cited

U.S. PATENT DOCUMENTS

| | | | | |
|---|---|---|---|---|
| 2024/0070168 | A1* | 2/2024 | Lee | G06F 16/275 |
| 2024/0176799 | A1 | 5/2024 | Gunda et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
QuestDB, "Database replication", 2025 https://questdb.com/docs/configuration/#database-replication.

* cited by examiner

300

412

| HTTPS Active connections | 1 Second (414a) | 10 Seconds (414b) | 1 Minute (414c) | 10 Minutes (414d) | 1 Hour (414e) | 6 Hours (414f) | 1 Day (414g) | 6 Days (414h) | 1 Month (414i) | 6 Months (414j) | 2 years (414k) |
|---|---|---|---|---|---|---|---|---|---|---|---|
| Min | 76 | 57 | 43 | 29 | 33 | 0 | 0 | 0 | | | |
| Max | 92 | 105 | 100 | 97 | 197 | 244 | 220 | 247 | | | |
| Average | 83.5697 | 71.8524 | 63.5808 | 54.7246 | 94.8461 | 127.902 | 45.4872 | 80.5148 | | | |

| | 514a | 514b | 514c | 514d | 514e | 514f | 514g | 514h | 514i | 514j | 514k |
|---|---|---|---|---|---|---|---|---|---|---|---|
| | 1 Second | 10 Seconds | 1 Minute | 10 Minutes | 1 Hour | 6 Hours | 1 Day | 6 Days | 1 Month | 6 Months | 2 years |
| Pending Object Count | 4 | 6 | 13 | 37 | 64 | 82 | 50 | 0 | 0 | 0 | 0 |
| Pending Object Usage (bytes) | 160 | 240 | 520 | 1480 | 2560 | 3280 | 2000 | 0 | 0 | 0 | 0 |

| Bucket Statistics | 1 Second | 10 Seconds | 1 Minute | 10 Minutes | 1 Hour | 6 Hours | 1 Day |
|---|---|---|---|---|---|---|---|
| Vectors | {2,12,4,5,6] | {3,4,6,21,6} | {2,5,8,32,5} | {1,2,3,4,5} | {2,5,8,32,5} | {2,5,8,32,5} | {2,5,8,32,5} |

FIG. 6

DYNAMIC DATA STRUCTURES FOR COORDINATING BUCKET OPERATIONS

CROSS-REFERENCE TO RELATED APPLICATIONS

This application claims priority to Indian Provisional Application No.: 202541009778, filed Feb. 6, 2025, titled "DYNAMIC DATA STRUCTURES FOR COORDINATING BUCKET OPERATIONS," which application is incorporated herein by reference.

BACKGROUND

Objects can be stored in buckets and backed up to other buckets. A bucket storing objects from which the objects are to be replicated can be referred to as a source bucket, while a bucket to which the objects are to be replicated can be referred to as a target bucket. A delay between replication of objects from the source bucket to the target bucket can potentially result in lost data.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 4 illustrates an example data structure for tracking active HTTPS connections of a bucket.

FIG. 5 illustrates an example data structure for tracking objects pending replication in a source bucket.

FIG. 6 illustrates an example data structure including vectors for various different parameters.

DETAILED DESCRIPTION

Figure 1:
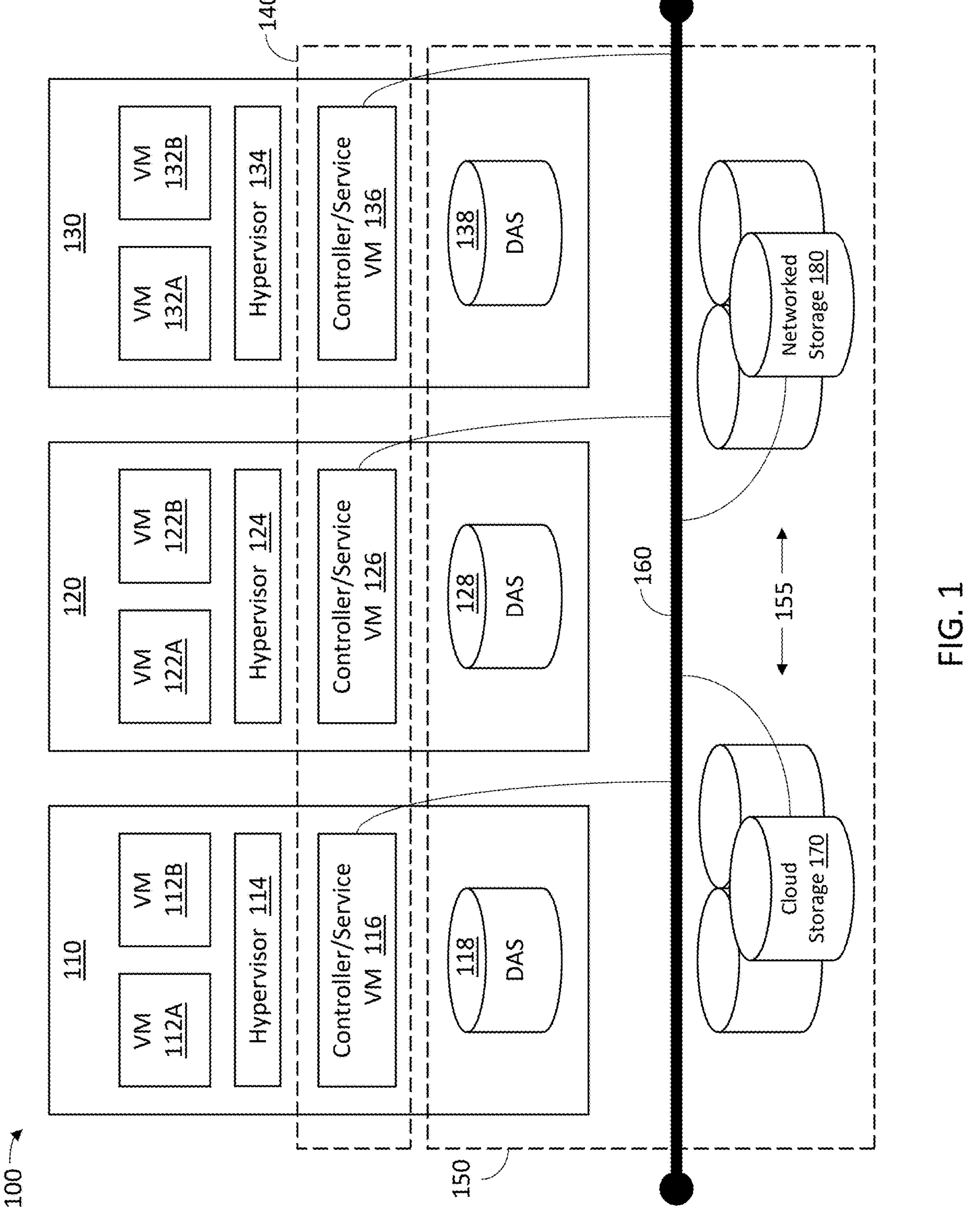
FIG. 1 is a block diagram of an example cluster of a virtual computing system, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Replicating objects from a source bucket to a target bucket can be performed to provide a backup of the objects in the source bucket. Conventional solutions, for scalability, rely on random or semi-random selection of candidate objects for replication. In order to detect objects which need to be replicated, some conventional solutions rely on a Write Ahead Log (WAL) type of infrastructure which records the identity of the objects to be replicated in a temporal order. While these solutions may work well for small systems, they do not scale due to two reasons: 1) WAL updates need to be centralized. If a solution is built around partitioning of WALs, the WALs need to be merged periodically to derive the temporal order of entries, and 2) If there are failures in WAL-based solutions, the entries in the WALs accumulate, making such an approach difficult to scale in the presence of failures. In some circumstances, the accumulation of entries in the WAL may even require a state larger than the total number of objects in the system.

Other conventional solutions rely upon replicating objects as they are returned in a scan of objects pending replication. These conventional solutions may cause replication of objects to be delayed if there is a large number of incoming objects. In an example, if a large number of objects are added to a bucket, there will be a large number of pending objects and the speed of replication may not be sufficient to replicate objects as quickly as they are created. In this example, an object may be pending replication from the time it is created until a time when the speed of replication catches up with the speed of object creation and all pending objects are replicated. In this example, the object can be pending replication (as other objects are replicated) for hours, days, or weeks, depending on the speed of replication and the amount of new objects.

Aspects of the present disclosure solve this technical problem to improve replication of objects and reduce the time since last synchronization between a source bucket and a target bucket. The present disclosure provides a solution which tracks objects to be replicated in the same way that it remembers the object metadata, allowing for scalability in the number of objects that can be replicated as well as the number of errors the system can handle. Implementations and examples are directed to a data structure that tracks metadata of objects to classify the objects according to various parameters, such as age or time since creation of the objects. The classifications of the data structure allow the data structure to be a space-efficient way to track the age of the objects and to coordinate bucket operations based on the age of the objects. The data structure allows for prioritization of older objects for replication, reducing the time since last synchronization between the source bucket and the target bucket. Object metadata can be persisted in a distributed key-value store.

FIG. 1 is a block diagram of an example cluster 100 of a virtual computing system, in accordance with some embodiments of the present disclosure. The cluster 100 may be incorporated in a cloud based implementation, an on-premises implementation, or a combination of both. An on-premises implementation may be a datacenter that is not part of a cloud. In an example, an organization's servers that it owns and controls for its use can be an on-premises implementation. The cluster 100 may be part of a hyperconverged system or any other type of system. The cluster 100 includes a plurality of nodes, such as a first node 110, a second node 120, and a third node 130. Each of the first node 110, the second node 120, and the third node 130 may also be referred to as a "host" or "host machine." The first node 110 includes database virtual machines ("database VMs") 112A and 112B (collectively referred to herein as "database VMs 112"), a hypervisor 114 configured to create and run the database VMs, and a controller/service VM 116 configured to manage, route, and otherwise handle workflow requests between the various nodes of the cluster 100. Similarly, the second node 120 includes database VMs 122A and 122B (collectively referred to herein as "database VMs 122"), a hypervisor 124, and a controller/service VM 126, and the third node 130 includes database VMs 132A and 132B (collectively referred to herein as "database VMs 132"), a hypervisor 134, and a controller/service VM 136. The controller/service VM 116, the controller/service VM 126, and the controller/service VM 136 are all connected to a network 160 to facilitate communication between the first node 110, the second node 120, and the third node 130. Although not shown, in some embodiments, the hypervisor 114, the hypervisor 124, and the hypervisor 134 may also be connected to the network 160. Further, although not shown, one or more of the first node 110, the second node 120, and the third node 130 may include one or more containers managed by a monitor (e.g., container system). In some embodiments, the controller/service VMs 116, 126, and 136 are not included in the cluster 100. The controller/service VMs 116, 126, and 136 may be in a first domain while the VMs 112, 122, and 132 are in a second domain. In an example, the controller/service VMs 116, 126, 136 are in a first cloud, the VMs 112 are in a second cloud, the VMs 116 are in a third cloud, and the VMs 132 are in a fourth cloud. In another example, the controller/service VMs 116, 124, 132 are in a first AWS account and the VMs 112, 122, and 132 are each in different, separate AWS accounts. Thus, the nodes 110, 120, and 130 may be nodes of various public or private clouds, with the controller/service VMs 116, 126, and 136 being separate from the VMs 112, 122, and 132. In an example, the controller/service VMs 116, 126, and 136 host a distributed control plane for managing the VMs 112, 122, and 132, where the VMs 112, 122, and 132 are database server VMs in public cloud accounts separate from a cloud account associated with the control plane.

The controller/service VMs 116, 126, and 136 can be considered a control plane and the VMs 112, 122, and 132 can be considered a data plane. The data plane may include data which is separate from the control logic executed on the control plane. VMs may be added to or removed from the data plane. AS discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 150 (also referred to herein as storage subsystem). The storage pool 150 may include network-attached storage 155 and direct-attached storage 118, 128, and 138. The network-attached storage 155 is accessible via the network 160 and, in some embodiments, may include cloud storage 170, as well as a networked storage 180. In contrast to the network-attached storage 155, which is accessible via the network 160, the direct-attached storage 118, 128, and 138 includes storage components that are provided internally within each of the first node 110, the second node 120, and the third node 130, respectively, such that each of the first, second, and third nodes may access its respective direct-attached storage without having to access the network 160.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 110, the second node 120, and the third node 130) are shown in the cluster 100, in other embodiments, greater than or fewer than three nodes may be provided within the cluster. Likewise, although only two database VMs (e.g., the database VMs 112, the database VMs 122, the database VMs 132) are shown on each of the first node 110, the second node 120, and the third node 130, in other embodiments, the number of the database VMs on each of the first, second, and third nodes may vary to include other numbers of database VMs. Further, the first node 110, the second node 120, and the third node 130 may have the same number of database VMs (e.g., the database VMs 112, the database VMs 122, the database VMs 132) or different number of database VMs.

In some embodiments, each of the first node 110, the second node 120, and the third node 130 may include a hardware device, such as a server. For example, in some embodiments, one or more of the first node 110, the second node 120, and the third node 130 may include a server computer provided by Nutanix, Inc., Dell, Inc., Lenovo Group Ltd. or Lenovo PC International, Cisco Systems, Inc., etc. In other embodiments, one or more of the first node 110, the second node 120, or the third node 130 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 110, the second node 120, and the third node 130 may be organized in a variety of network topologies. Each of the first node 110, the second node 120, and the third node 130 may also be configured to communicate and share resources with each other via the network 160. For example, in some embodiments, the first node 110, the second node 120, and the third node 130 may communicate and share resources with each other via the controller/service VM 116, the controller/service VM 126, and the controller/service VM 136, and/or the hypervisor 114, the hypervisor 124, and the hypervisor 134.

Also, although not shown, one or more of the first node 110, the second node 120, and the third node 130 may include one or more processing units configured to execute instructions. The instructions may be carried out by a special purpose computer, logic circuits, or hardware circuits of the first node 110, the second node 120, and the third node 130. The processing units may be implemented in hardware, firmware, software, or any combination thereof. The term "execution" is, for example, the process of running an application or the carrying out of the operation called for by an instruction. The instructions may be written using one or more programming languages, scripting languages, assembly language, etc. The processing units, thus, execute an instruction, meaning that they perform the operations called for by that instruction.

The processing units may be operably coupled to the storage pool 150, as well as with other elements of the first node 110, the second node 120, and the third node 130 to receive, send, and process information, and to control the operations of the underlying first, second, or third node. The processing units may retrieve a set of instructions from the storage pool 150, such as, from a permanent memory device like a read only memory ("ROM") device and copy the instructions in an executable form to a temporary memory device that is generally some form of random access memory ("RAM"). The ROM and RAM may both be part of the storage pool 150, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 150 and particularly with respect to the direct-attached storage 118, 128, and 138, each of the direct-attached storage may include a variety of types of memory devices that are suitable for a virtual computing system. For example, in some embodiments, one or more of the direct-attached storage 118, 128, and 138 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 155 may include any of a variety of network accessible storage (e.g., the cloud storage 170, the networked storage 180, etc.) that is suitable for use within the cluster 100 and accessible via the network 160. The storage pool 150, including the network-attached storage 155 and the direct-attached storage 118, 128, and 138, together form a distributed storage system configured to be accessed by each of the first node 110, the second node 120, and the third node 130 via the network 160, the controller/service VM 116, the controller/service VM 126, the controller/service VM 136, and/or the hypervisor 114, the hypervisor 124, and the hypervisor 134. In some embodiments, the various storage components in the storage pool 150 may be configured as virtual disks for access by the database VMs 112, the database VMs 122, and the database VMs 132.

Each of the database VMs 112, the database VMs 122, the database VMs 132 is a software-based implementation of a computing machine. The database VMs 112, the database VMs 122, the database VMs 132 emulate the functionality of a physical computer. Specifically, the hardware resources, such as processing unit, memory, storage, etc., of the underlying computer (e.g., the first node 110, the second node 120, and the third node 130) are virtualized or transformed by the respective hypervisor 114, the hypervisor 124, and the hypervisor 134, into the underlying support for each of the database VMs 112, the database VMs 122, the database VMs 132 that may run its own operating system and applications on the underlying physical resources just like a real computer. By encapsulating an entire machine, including CPU, memory, operating system, storage devices, and network devices, the database VMs 112, the database VMs 122, the database VMs 132 are compatible with most standard operating systems (e.g. Windows, Linux, etc.), applications, and device drivers.

Thus, each of the hypervisor 114, the hypervisor 124, and the hypervisor 134 is a virtual machine monitor that allows a single physical server computer (e.g., the first node 110, the second node 120, third node 130) to run multiple instances of the database VMs 112, the database VMs 122, and the database VMs 132 with each VM sharing the resources of that one physical server computer, potentially across multiple environments. For example, each of the hypervisor 114, the hypervisor 124, and the hypervisor 134 may allocate memory and other resources to the underlying VMs (e.g., the database VMs 112, the database VMs 122, the database VMs 132) from the storage pool 150 to perform one or more functions.

By running the database VMs 112, the database VMs 122, and the database VMs 132 on each of the first node 110, the second node 120, and the third node 130, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 110, the second node 120, and the third node 130, each of the new database VMs may be configured to be associated with certain hardware resources, software resources, storage resources, and other resources within the cluster 100 to allow those virtual VMs to operate as intended.

The database VMs 112, the database VMs 122, the database VMs 132, and any newly created instances of the database VMs may be controlled and managed by their respective instance of the controller/service VM 116, the controller/service VM 126, and the controller/service VM 136. The controller/service VM 116, the controller/service VM 126, and the controller/service VM 136 are configured to communicate with each other via the network 160 to form a distributed system 140. Each of the controller/service VM 116, the controller/service VM 126, and the controller/service VM 136 may be considered a local management system configured to manage various tasks and operations within the cluster 100. For example, in some embodiments, the local management system may perform various management related tasks on the database VMs 112, the database VMs 122, and the database VMs 132.

The hypervisor 114, the hypervisor 124, and the hypervisor 134 of the first node 110, the second node 120, and the third node 130, respectively, may be configured to run virtualization software, such as, ESXi from VMWare, AHV from Nutanix, Inc., XenServer from Citrix Systems, Inc., etc. The virtualization software on the hypervisor 114, the hypervisor 124, and the hypervisor 134 may be configured for running the database VMs 112, the database VMs 122, the database VM 132A, and the database VM 132B, respectively, and for managing the interactions between those VMs and the underlying hardware of the first node 110, the second node 120, and the third node 130. Each of the controller/service VM 116, the controller/service VM 126, the controller/service VM 136, the hypervisor 114, the hypervisor 124, and the hypervisor 134 may be configured as suitable for use within the cluster 100.

The network 160 may include any of a variety of wired or wireless network channels that may be suitable for use within the cluster 100. For example, in some embodiments, the network 160 may include wired connections, such as an Ethernet connection, one or more twisted pair wires, coaxial cables, fiber optic cables, etc. In other embodiments, the network 160 may include wireless connections, such as microwaves, infrared waves, radio waves, spread spectrum technologies, satellites, etc. The network 160 may also be configured to communicate with another device using cellular networks, local area networks, wide area networks, the Internet, etc. In some embodiments, the network 160 may include a combination of wired and wireless communications. The network 160 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 110, the second node 120, or the third node 130 may be configured as a leader node. The leader node may be configured to monitor and handle requests from other nodes in the cluster 100. For example, a particular database VM (e.g., the database VMs 112, the database VMs 122, or the database VMs 132) may direct an input/output request to the controller/service VM (e.g., the controller/service VM 116, the controller/service VM 126, or the controller/service VM 136, respectively) on the underlying node (e.g., the first node 110, the second node 120, or the third node 130, respectively). Upon receiving the input/output request, that controller/service VM may direct the input/output request to the controller/service VM (e.g., one of the controller/service VM 116, the controller/service VM 126, or the controller/service VM 136) of the leader node. In some cases, the controller/service VM that receives the input/output request may itself be on the leader node, in which case, the controller/service VM does not transfer the request, but rather handles the request itself.

The controller/service VM of the leader node may fulfill the input/output request (and/or request another component within/outside the cluster 100 to fulfill that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 116, the controller/service VM 126, the controller/service VM 136 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 112, 122, and 132 are not in the same nodes as the controller/service VMs 116, 126 134. The VMs 112, 122, and 132 may be located in a different cloud than the controller/service VMs 116, 126 134.

Figure 2:
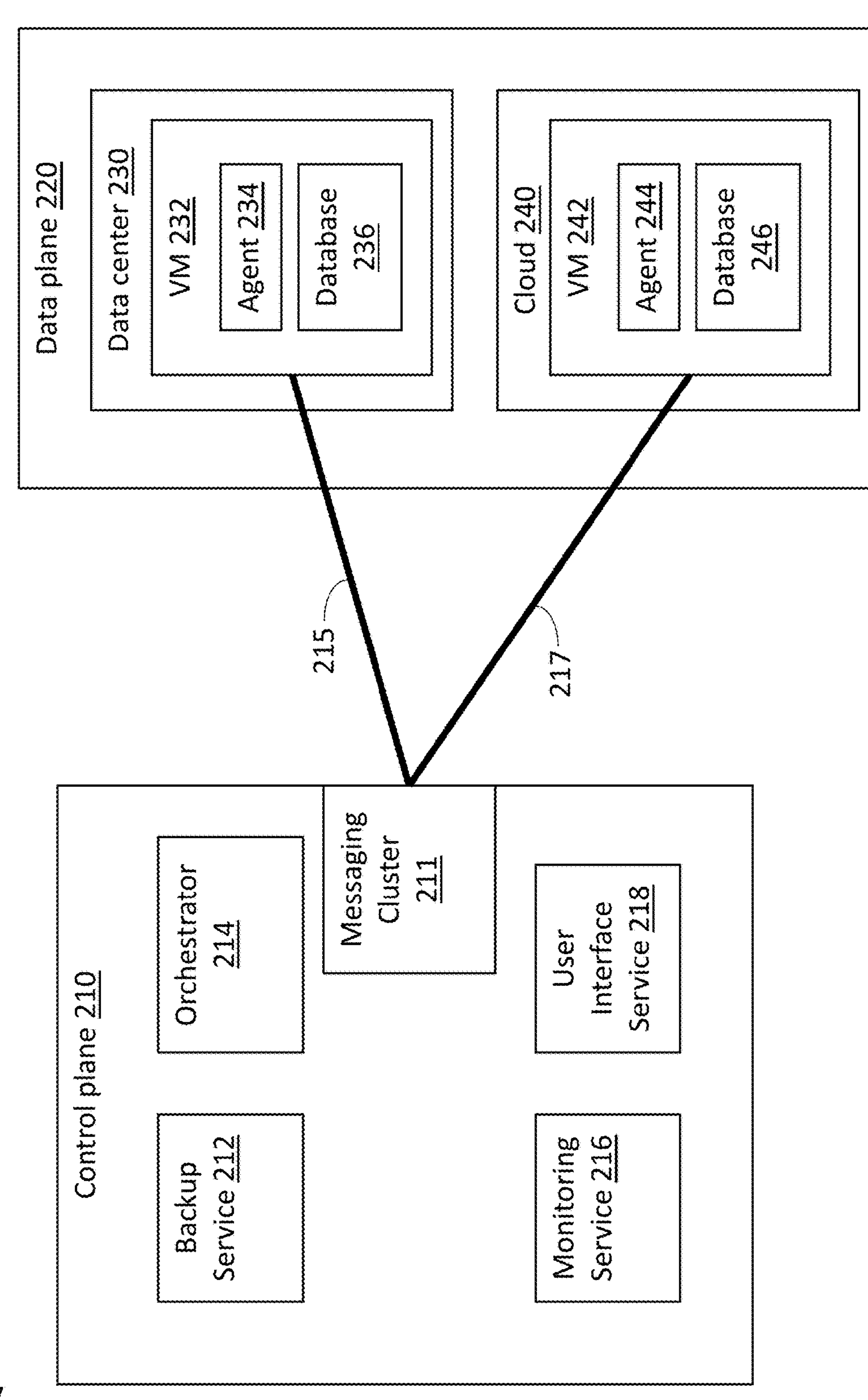
FIG. 2 is a block diagram of an example database management system, in accordance with some embodiments of the present disclosure.

FIG. 2 is a block diagram of an example database management system 200, in accordance with some embodiments of the present disclosure. The database management system 200 may be implemented using one or more clusters, such as the cluster 100 of FIG. 1. In some implementations, one or more components of the database management system 200 are implemented as clusters.

The database management system 200 includes a control plane 210 and a data plane 220. The control plane 210 manages database operations of databases on the data plane 220. The data plane 220 may include databases and virtual machines across multiple different geographies, data centers, public clouds and/or private clouds. Thus, the control plane 210 may manage database operations across multiple different geographies, data centers, public clouds and/or private clouds. The control plane 210 may provide hybrid cloud database management services for databases having instances both on-premises and in public clouds. The control plane 210 may include one or more processors and a memory including computer-readable instructions which cause the one or more processors to perform operations described herein.

The data plane 220 includes a first VM 232 and a second VM 242. The first VM 232 may be hosted in a data center 230. The second VM may be hosted on a cloud 240 such as a public or private cloud and be associated with a cloud account. The first VM 232 includes a first agent 234 of the control plane 210 and a first database 236. The first agent 234 receives commands and operations from the control plane 210 and transmits information to the control plane 210 to provide database management services for the first database 236. The second VM includes a second agent 244 of the control plane 210 and a second database 246. The second agent 244 receives commands and operations from the control plane 210 and transmits information to the control plane 210 to provide database management services for the second database 246.

While the data plane 220 is illustrated as including the first VM 232 hosted in the data center 230 and the second VM 242 hosted on the cloud 240, the data plane 220 may manage database operations of (e.g., send commands to) a plurality of VMs hosted across multiple public clouds, private clouds, and/or on-premises systems. Similarly, the data center 230 may host a plurality of VMs and may include one or more on-premises systems and/or components of a public cloud or private cloud. The control plane 210 may be able to manage database operations of the plurality of VMs across the multiple public clouds, private clouds, and/or on-premises systems by sending commands, modified based on the hosting location, to the plurality of VMs. In this way, the control plane 210 provides a unified user interface for managing VMs in a hybrid cloud environment spanning on-premises systems, public clouds, and private clouds.

The first and second VMs 232, 242 may be termed "database servers," as they serve as virtual database servers for hosting the first and second databases 236, 246. The first and second VMs 232, 242 may be hosted on clusters of nodes, such as the cluster 100 of FIG. 1.

The first agent 234 sends and receives messages from the control plane 210 over a first single communication channel 215. The second agent 244 sends and receives messages from the control plane 210 over a second single communication channel 217. Each of the first and second single communication channels 215, 217 may be single transmission control protocol (TCP) connections. In this way, the control plane 210 is able to open only a single communication channel for each agent associated with each database. Although two VMs are illustrated, the control plane 210 may provide database management services for hundreds, thousands, or millions of VMs. With hundreds of VMs, limiting the number of connections between the control plane 210 and each VM conserves a large amount of compute and network resources.

The control plane 210 includes a messaging cluster 211. The messaging cluster 211 may be a cluster of nodes such as the cluster 100 of FIG. 1 executing a messaging service or messaging application. The messaging cluster 211 may receive messages from the first agent 234 over the first single communication channel 215 and messages from the second agent 244 over the second single communication channel 217. The messaging cluster 211 may isolate messages between different VMs. In an example, the messaging cluster 211 monitors tags, ids, or other indications of origin of the messages to determine that messages from the first agent

234 are received on the first single communication channel 215. In this example, if a message received on the first single communication channel 215 includes an identifier indicating the message originated at a different VM, the message is dropped. Similarly, if a message including an identifier of the first VM 232 is received on the second communication channel 217 or any other communication channel besides the first communication channel 215, the message is dropped.

The messaging cluster 211 may direct messages from the first and second VMs 232, 242 to various components of the control plane 210 based on characteristics of the control plane 210. The messaging cluster 211 may include different topics for sending and receiving messages on the first and second single communication channels 215, 217. In an example, the messaging cluster 211 may route messages in an operations topic, a requests topic, and a commands topic.

The control plane 210 includes an orchestrator 214 to orchestrate database management services. In some implementations, the orchestrator 214 may be implemented as a service or container. Similarly, other components of the control plane 210 may be implemented as services or containers. The orchestrator 214 may receive database management service requests from other components of the control plane 210. The orchestrator 214 generates operations and sends the operations and/or commands associated with the operations to the messaging cluster 211. In an example, the orchestrator receives a clone database request for the first VM 232, generates a clone database operation, and sends commands for generating a clone database for the first VM 232 to the messaging cluster 211 for sending to the first agent 234 using the first single communication channel 215.

The control plane includes a backup service 212. The backup service 212 may determine when to generate backups of the first and second VMs 232, 242 and/or when to generate clone databases for the first and second databases 236, 246. The backup service 212 may determine when to generate backups and/or clone databases based on service level agreements (SLAs). In an example, a first SLA for the first VM 232 may cause the backup service 212 to generate and send a backup request for the first VM 232 to the orchestrator 214 every day. In an example, a second SLA for the second VM 242 may cause the backup service 212 to generate and send a backup request for the second VM 242 to the orchestrator 214 every day.

The control plane includes a monitoring service 216. The monitoring service 216 may monitor a status of the first database 236 and/or a status of the second database 246. In some implementations, the second database 246 is a backup database of the first database 236 and the monitoring service 216 monitors the status of the first database 236 in order to determine when to recover the first database 236 using the second database 246 or to perform a failover to the second database 246. The monitoring service 216 may monitor the status of the first database 236 and/or the status of the second database 246 by monitoring messages between the control plane 210 and the first and second databases 236, 246. In an example, if the control plane 210 sends a message to the first database 236 and a response is not received within a predetermined time period, the monitoring service 216 determines that the first database 236 is not available.

The control plane 210 includes a user interface service 218. The user interface service 218 provides an interface for a user of the control plane 210. The user interface service 218 may expose data of the control plane 210 to the user. The user interface service 218 may expose only data associated with the user to the user. The user interface service 218 displays which backups and/or clones are available for recovery. The user interface service 218 may display which backups and/or clones are pending. The user interface service 218 receives user input, such as a selection of a backup for recovery or a selection of an SLA for a VM.

The control plane 210 may include additional components not illustrated. Only the illustrated components are included for clarity. In some implementations, multiple instances of the control plane 210 may be implemented in order to provide database management services to additional virtual machines or databases. In some implementations, the components of the control plane 210 may be services which may be implemented in multiple instances. In this way, the control plane 210 is highly scalable to provide database management services to additional VMs.

In some implementations, the backup service 212 includes backup service entities, or instances on the control plane 210 that are created each time a database is provisioned. Each backup service entity is associated with a database and manages all database management tasks for the associated database. The backup service entity may be a logic construct that handles all data management aspects for the associated database. The backup service entity can handle the creation of backups for the database, the creation of snapshots, and the capture of logs. In some implementations, the backup service entity defines a service level agreement (SLA) or ingest an SLA to be applied to the database. The backup service entity can provide point-in-time recovery (PITR) for the database using the captured snapshots and logs. In an example, a user indicates, using the user interface service 218 that the database is to be restored to a particular point in time, and the backup service entity applies a corresponding snapshot and logs to the database to restore the database to the particular point in time. The backup service entity allows for management of data of the database, providing for users to export some or all of the data of the database (e.g., schema, tables, rows). The database entity can provide metadata management, allowing applications to use the database as a dedicated metadata store. The backup service entity can detect sensitive data in the database. In some implementations, the backup service entity can obscure or mask the sensitive data. The backup service entity may allow for users to specify who can access the database (e.g., access policy). The backup service entity can allow users to set data pipelines, such as data lakes. In an example, the backup service entity performs data processing on data in the database, or orchestrates data processing of the data in the database to send the data to a data store (e.g., data lake, data warehouse). In some implementations, the backup service entity provides data analytics corresponding to usage of the data in the database, an amount of data in the database, changes to the data in the database, and other information.

Figure 3:
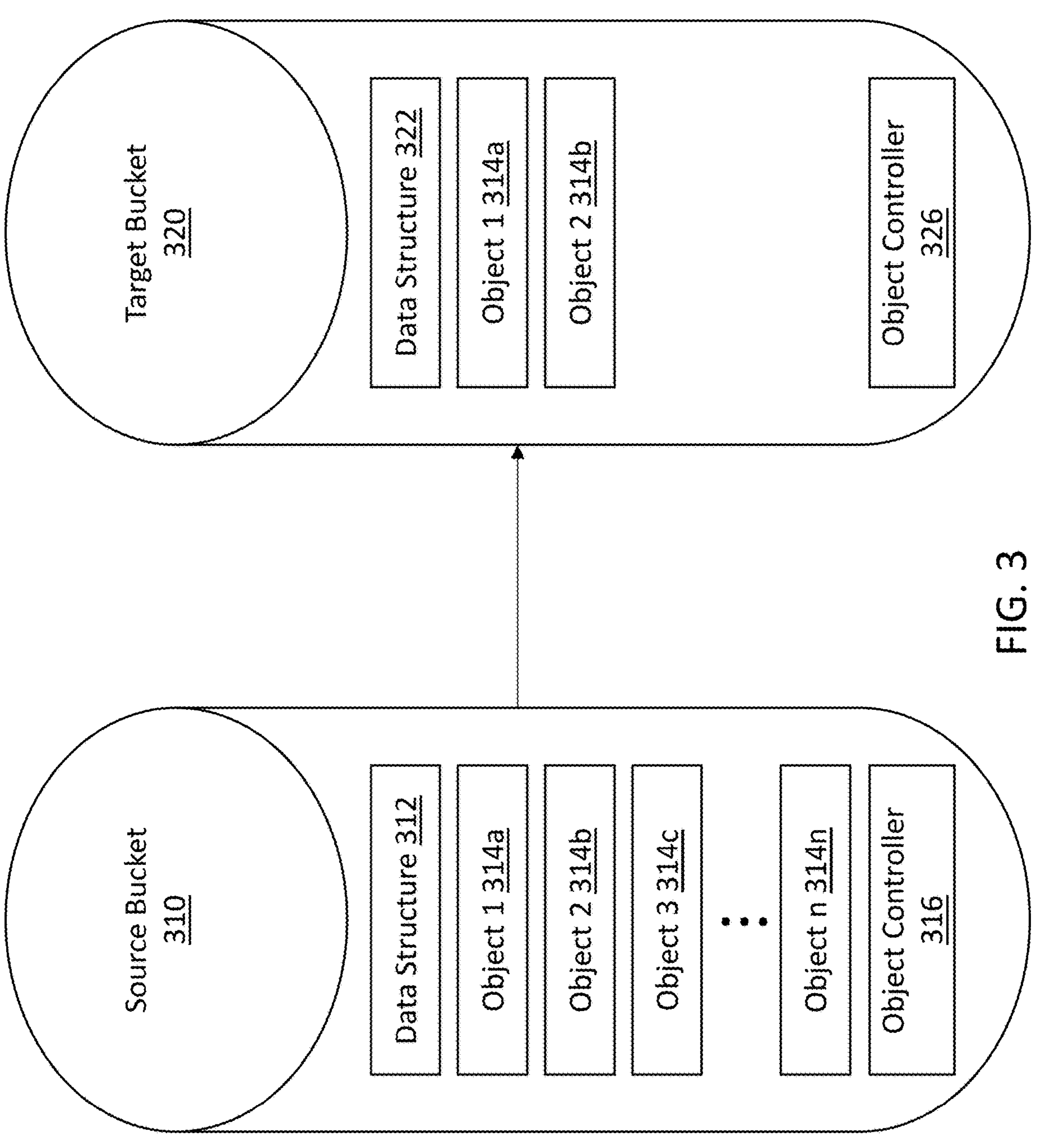
FIG. 3 is a block diagram of an example system for generating and using data structures to coordinate replication of objects from a source bucket to a target bucket.

FIG. 3 is a block diagram of an example system 300 for generating and using data structures to coordinate replication of objects from a source bucket 310 to a target bucket 320.

The source bucket 310 includes a plurality of objects 314, including a first object 314*a*, a second object 314*b*, a third object 314*c*, and an nth object 314*n*. The plurality of objects can include any number of objects. The data structure 312 includes metadata of the plurality of objects 314. The data structure 312 can include metadata indicated when the plurality of objects 314 were created or added to the source bucket 310. The data structure 312 can include multiple slots (e.g., categories, partitions, classifications, etc.) for the metadata of the plurality of objects 314 metadata indicating when the objects were created or added to the source bucket.

The data structure 312 can be used to determine various parameters of the plurality of objects 314 and/or the source bucket 310 including when the objects were created or added to the source bucket 310, a number of connections (e.g., HTTPS connections as illustrated in FIG. 4) the source bucket 310 has, errors occurring in the source bucket 310, total number of objects in the bucket, total space usage of the source bucket 310, and other parameters. The data structure 312 can be used to generate a visual representation of the data structure 312 or the data of the data structure 312 and/or to coordinate actions performed within the source bucket 310 or between the source bucket 310 and the target bucket 320.

In some implementations, the source bucket 310 includes an object controller 316. The object controller 316 can manage creation, modification, deletion, and/or replication of the plurality of objects 314 to the target bucket 320. In some implementations, the object controller 316 generates and updates the data structure 312. The object controller 316 can receive commands from other computing devices and execute the commands within the source bucket 310. In an example, the object controller 316 receives a command from the control plane 210 of FIG. 2 to replicate the plurality of objects 314 from the source bucket 310 to the target bucket 320.

The object controller 316 can use the data structure to coordinate and/or schedule actions performed by the object controller 316. The data structure 312 can include metadata of the plurality of objects 314 to allow the object controller 316 to coordinate and/or schedule actions based on the metadata of the plurality of objects 314. In some implementations, the object controller 316 references the data structure to coordinate replication of the plurality of objects 314 from the source bucket 310 to the target bucket. In an example, the object controller 316 uses the data structure to determine which objects of the plurality of objects 314 have been pending replication the longest (i.e., created or added to the source bucket 310 but not yet replicated to the target bucket 320). In this example, the object controller 316 can prioritize the older objects (i.e., longest-pending objects) in order to reduce a time since a last replication and to reduce an amount of data that could potentially be lost upon failure of the source bucket 310.

The target bucket 320 may be on the same cluster as the source bucket 310, in another cluster, or in a cloud environment separate from the environment of the source bucket 310 (e.g., cloud storage endpoint). The plurality of objects 314 may be replicated asynchronously from the source bucket 310 to the target bucket 320. The plurality of objects 314 may be replicated to the target bucket 320 based on when the plurality of objects 314 are each created or added to the source bucket 310 using the data structure 312, as discussed herein. The plurality of objects 314 may be replicated to the target bucket 320 based on the "age" of the plurality of objects 314, or when the plurality of objects 314 were created or added to the source bucket 310. The plurality of objects 314 can be replicated in an order that prioritizes older objects in order to ensure that all objects are replicated to the target bucket 320 and to reduce a time since the last synchronization between the source bucket 310 and the target bucket 320. If the plurality of objects 314 were not replicated to prioritize older objects, an object might never be replicated if new objects are continuously replicated before the object. By prioritizing older objects, the plurality of objects 314 can be replicated to the target bucket 320 in an efficient manner that reduces a time since last synchronization.

As shown in FIG. 3, the first object **314*a* and the second object 314*b* have been replicated to the target bucket 320, while the third object 314*c* through the nth object 314*n* have not been replicated to the target bucket 320. The first object 314*a* is older (was created or added to the source bucket 310 earlier) than the second object 314*b* and the second object 314*b* is older than the objects from the third object 314*c* through the nth object 314*n*. In an example, the first object 314*a* was added to the source bucket 310 one hour ago, the second object 314*b* was added to the source bucket 310 forty minutes ago, and the third object was added to the source bucket 310 fifteen minutes ago. In this example, a time since last synchronization of the source bucket 310 and the target bucket 320 is fifteen minutes, as the source bucket 310 and the target bucket 320 included the same objects (the first object 314*a* and the second object 314*b*) until the third object 314*c* was added to the source bucket 310. If, in this example, the replication of objects was not prioritized based on age and the second object 314*b* and the third object 314*c* were replicated to the target bucket 320 before the first object 314*a*, the time since last synchronization would be one hour (the age of the first object 314*a***).

The target bucket 320 includes an object controller 326 and a data structure 322. The object controller 326 may manage the plurality of objects 314 replicated to the target bucket 320. The data structure 322 can store metadata of the plurality of objects 314 replicated to the target bucket 320. The data structure 322 can track when the plurality of objects 314 were replicated to the target bucket 320. In some implementations, the object controller 326 uses the data structure 322 to coordinate and verify replication of the plurality of objects 314 from the source bucket 310 to the target bucket 320. In an example, the object controller 326 transmits an acknowledgement of the replication of the plurality of objects 314 to the object controller 316. In an example, the object controller 326 uses the data structure 322 to generate a summary of objects replicated to the target bucket 320 over time. The summary generated by the object controller 326 can be compared to a summary of objects replicated generated by the object controller 316 to determine a time since last synchronization over time.

FIG. 4 illustrates an example data structure 412 for tracking active HTTPS connections of a bucket. The data structure 412 may be an example of the data structure 312 of FIG. 3, or a portion of the data structure 312 of FIG. 3. The data structure 412 (and other similar data structures discussed herein) may be an example of a data structure for tracking "telescopic statistics" persistently and efficiently. Telescopic statistics maintain statistics using multiple nested levels of sliding windows (also referred to herein as "slots") that correspond to different intervals of time with different granularity. The data structures for telescopic statistics can use a sparse list of slots with an accumulator for each slot. The sparse list of slots captures a larger historical time window as it progresses from lower to higher levels. Data from previous slots of lower layers are accumulated into a single accumulator for a longer interval before entering the next higher layer in the sparse list of slots. Telescopic statistics can be collected for various different historical statistics for measuring activity or health of buckets or clusters. Data structures described herein can be used to maintain telescopic statistics for number of pending objects, size of pending objects, number of PUT requests, number of GET requests, number of HTTPS connections, and other parameters.

The data structure 412 is an example of a data structure for telescopic statistics for tracking active HTTPS connections. The data structure 412 may be a visual representation of a data structure, or a visual representation generated using a data structure. The data structure 412 includes a plurality of time slots 414 for tracking the minimum, maximum, and average number of HTTPS connections within the plurality of time slots 414. While the term "slots" is used for ease of understanding and for correspondence with the illustration of FIG. 4, the term "slots" refers to a category, classification, or other indication of a period of time that is associated with object metadata within the data structure 412. The plurality of time slots 414 include a first slot 414*a*, a second slot 414*b*, a third slot 414*c*, a fourth slot 414*d*, a fifth slot 414*e*, a sixth slot 414*f*, a seventh slot 414*g*, an eighth slot 414*h*, a ninth slot 414*i*, a tenth slot 414*j*, and an eleventh slot 414*k*. The plurality of time slots 414 can include any number of time slots with any level of granularity. The specific time slots of the plurality of time slots 414 illustrated in FIG. 4 are provided for illustration purposes only.

The first slot 414*a* tracks HTTPS connections within a last second, or a most recent second. The second slot 414*b* tracks HTTPS connections between one second and ten seconds. The third slot 414*c* tracks HTTPS connections between ten seconds and one minute. The fourth slot 414*d* tracks HTTPS connections between one minute and ten minutes. The fifth slot 414*e* tracks HTTPS connections between ten minutes and one hour (i.e., the fifty minutes before the most recent ten minutes). The sixth slot 414*f* tracks HTTPS connections between one hour and six hours (i.e., the five hours prior to the most recent hour). The seventh slot 414*g* tracks HTTPS connections between six hours and one day. The eighth slot 414*h* tracks HTTPS connections between one day and six days. The ninth slot 414*i* tracks HTTPS connections between six days and one month. The tenth slot 414*j* tracks HTTPS connections between one month and six months. The eleventh slot 414*k* tracks HTTPS connections between six months and two years. The ninth slot 414*i*, the tenth slot 414*j*, and the eleventh slot 414*k* are blank, as the bucket is younger than one month, so there is no total for connections between six days and one month for the ninth slot 414*i*, and no totals for connections for the longer time periods represented in the tenth slot 414*j* and the eleventh slot 414*k*.

The data structure 412 can be updated to reflect the passage of time and HTTPS connections in subsequent periods of time. In some implementations, the data structure 412 is updated at regular intervals, such as one second, or one minute. In some implementations, the data structure 412 is updated when a new HTTPS connection is created. In some implementations, the data structure 412 is updated in response to an API call to the bucket that includes a current time.

In some implementations, data from a slot of the plurality of time slots 414 can be accumulated to update a subsequent slot. In an example, data in the fifth slot 414*e* can be accumulated to update the sixth slot 414*f*, where five entries in the fifth slot 414*e* corresponding to five hours are accumulated to update the sixth slot 414*f*.

Metadata for the HTTPS connections may be stored in the corresponding slots of the plurality of time slots 414. The plurality of time slots 414 of the data structure 412 can be used to generate a summary of the HTTPS connections over time to provide a historical view of the bucket and its HTTPS connections. The summary or historical view can be used to identify trends or outliers in the number of HTTPS connections over time. The data structure 412 can be a more condensed, efficient data structure than full time-series data. In an example, time-series data for HTTPS connections for two years may include millions of data points, while the data structure includes data points equal to the number of slots in the plurality of time slots 414, providing a more efficient form for storing data and reducing a computational load in identifying trends. By adjusting the granularity and number of the plurality of time slots 414, different data can be collected for analysis. In an example where an equal level of granularity for each hour in a day is needed, the plurality of time slots 414 can include twenty-four slots that each correspond to a single hour in the day.

While the data structure 412 is illustrated as tracking HTTPS connections for a bucket in memory, the data structure 412 (or similar data structures) can be used to track different parameters of the bucket such as number of objects, total space usage, number of objects pending replication, total space usage of pending objects, number of PUT requests, number of GET requests, errors per second, number of errors, and other parameters on the disk persistently. In this way, the data structure 412 can be used to track various bucket parameters for coordinating bucket operations and providing a historical view of bucket activity.

FIG. 5 illustrates an example data structure 512 for tracking objects pending replication in a source bucket. The data structure 512 includes a plurality of time slots 514. The data structure 512 may be the data structure 312 of FIG. 3. The data structure 512 may be used to prioritize replication of older objects. While the term "slots" is used for ease of understanding and for correspondence with the illustration of FIG. 4, the term "slots" refers to a category, classification, or other indication of a period of time that is associated with object metadata within the data structure 512.

The plurality of time slots 514 include a first slot 514*a*, a second slot 514*b*, a third slot 514*c*, a fourth slot 514*d*, a fifth slot 514*e*, a sixth slot 514*f*, a seventh slot 514*g*, an eighth slot 514*h*, a ninth slot 514*i*, a tenth slot 514*j*, and an eleventh slot 514*k*. The plurality of time slots 514 can include any number of time slots with any level of granularity. The specific time slots of the plurality of time slots 514 illustrated in FIG. 5 are provided for illustration purposes only.

The first slot 514*a* tracks pending object count and pending object space usage within a last second, or a most recent second. The second slot 514*b* tracks pending object count and pending object space usage between one second and ten seconds. The third slot 514*c* tracks pending object count and pending object space usage between ten seconds and one minute. The fourth slot 514*d* tracks pending object count and pending object space usage between one minute and ten minutes. The fifth slot 514*e* tracks pending object count and pending object space usage between ten minutes and one hour (i.e., the fifty minutes before the most recent ten minutes). The sixth slot 514*f* tracks pending object count and pending object space usage between one hour and six hours (i.e., the five hours prior to the most recent hour). The seventh slot 514*g* tracks pending object count and pending object space usage between six hours and one day. The eighth slot 514*h* tracks pending object count and pending object space usage between one day and six days. The ninth slot 514*i* tracks pending object count and pending object space usage between six days and one month. The tenth slot 514*j* tracks pending object count and pending object space usage between one month and six months. The eleventh slot 514*k* tracks pending object count and pending object space usage between six months and two years. The eighth slot 514*h*, the ninth slot 514*i*, the tenth slot 514*j*, and the eleventh slot 514*k* are blank, as the bucket is younger than six days, so there are no totals between one day and six days for the eighth slot 514*h*, and no totals for objects for the longer time periods represented in the ninth slot 514*i*, the tenth slot 514*j*, and the eleventh slot 514*k*.

The data structure 512 can be updated as objects are added to a source bucket. When an object is created, it is added to the data structure 512 based on its creation time. In an example, when an object is created, the object (metadata of the object) is added to the first slot 514*a* based on the object being created within the last second. As the age of the object increases, the object is moved into older slots of the plurality of time slots 514. When the object is replicated from the source bucket to a target bucket, the object (metadata of the object) is removed from the data structure 512, as the object is no longer pending replication.

The data structure 512 can be used to determine a last synchronization time between the source bucket and the target bucket. As the data structure 512 tracks objects pending replication, to determine the last synchronization time, the data structure 512 can be scanned to identify the oldest slot of the plurality of time slots 514 that includes pending objects. In some implementations, scanning the data structure 512 includes querying the plurality of slots 514 from longest time period (i.e., oldest slot) to shortest time period (i.e., newest slot). In an example, the plurality of slots 514 are queried starting from the eleventh slot 514*k* and working towards the first slot 514*a*. In the example illustrated in FIG. 5, the seventh slot 514*g* is the oldest slot (i.e., slot corresponding to the oldest time period) that includes pending objects. As the seventh slot 514*g* is the oldest slot including pending objects, the last synchronization time is between the time periods of the seventh slot 514*g* and the eighth slot 514*h*, or between one day and six days. In an example, if the second slot 514*b* were the oldest slot including pending objects, the last synchronization time would be between ten seconds and one minute. In an example, if the fourth slot 514*d* were the oldest slot including pending objects, the last synchronization time would be between ten minutes and one hour. In some implementations, the last synchronization time is reported as the upper end of the range.

The data structure 512 can be used to prioritize replication of objects based on age or creation time. As the data structure 512 indicates how long objects have been pending according to which slot of the plurality of slots 514 the metadata of the objects are in, the data structure 512 can be queried to determine which objects are oldest in order to prioritize replication of the oldest objects. In an example, the data structure 512 is queried (e.g., by an object controller) to identify the oldest slot including pending objects of the plurality of slots 514. In this example, the objects corresponding to the oldest slot including pending objects (metadata of the objects is in the slot) are selected for replication to prioritize replication of older objects. In this example, the older objects can be selected for replication by determining a time stamp for filtering out objects that are not in the oldest slot. In the example illustrated in FIG. 5, the seventh slot 514*g* is the oldest slot and a time stamp of six hours prior to the current time is determined to filter out all objects in the first slot 514*a* through the sixth slot 514*f* in order to filter out objects in the first slot 514*a* through the sixth slot 514*f* (i.e., objects having time stamps newer than the determined time stamp) and select the objects in the seventh slot 514*g* (i.e., objects having time stamps older than the determined time stamp) for replication.

In some implementations, the data structure 512 is updated at regular intervals (e.g., periodically) to move metadata of objects to older slots as time passes. In an example, all of the slots of the plurality of slots 514 are updated every ten minutes. In some implementations, the data structure 512 is updated in response to accumulations of entries in slots. In an example, as entries in a slot accumulate to equal the size of a subsequent slot, the subsequent slot is updated. In an example, after five entries in the second slot 514*b*, the third slot 514*c* is updated using the five accumulated entries of the second slot 514*b*. In some implementations, the data structure 512 is updated each time a new object is created. In an example, when a new object is created, the data structure 512 is updated by updating a time stamp of each slot (i.e., current time plus time interval for the slot) and updating the placement of objects within the plurality of slots based on a time created time stamp of each object.

In some implementations, each time a new object is added, or each time a time interval passes, a new data structure is created reflecting the current status of the pending objects. In some implementations, each time a new object is added, or each time a time interval passes, changes (e.g., delta values) to the plurality of slots 514 of the data structure 512 are stored to be merged with the data structure 512 to update the data structure 512. In an example, when the data structure 512 is queried, or a visual representation of the data structure 512 is requested, the data structure 512 is updated by merging the changes to the plurality of slots 514 of the data structure 512 with the data structure 512.

FIG. 6 illustrates an example data structure 612 including vectors for various different parameters. The data structure 612 can be similar to the data structure 412 of FIG. 4 and/or the data structure 512 of FIG. 5, with the difference that the data structure 612 includes vectors in each slot. While the data structure 512 includes two rows for pending object count and pending object usage, the data structure 612 includes one row containing vectors with values corresponding to various different parameters, allowing for efficient storage of parameters within the data structure 612. In an example, the data structure 612 includes a vector in each slot, where a first value in each vector corresponds to pending object count, a second value in each vector corresponds to pending object space usage, a third value in each vector corresponds to a number of PUT requests, a fourth value in each vector corresponds to a number of GET requests, and a fifth value in each vector corresponds to a number of errors per second. The vectors in the slots of the data structure 612 can include any number of values. In this way, the data structure 612 can store temporally-divided values for any number of bucket parameters.

As discussed herein, the data structure 412, 512, and 612 are visual representations corresponding to data. Thus, the structure of the data structure 512 and the data structure 612 may be the same or similar, with the data structure 512 including a vector for each slot having two values corresponding to pending object count and pending object usage. In some implementations, visual representations can be generated using the vectors of the data structure 612 or a portion of the vectors of the data structure 612. In an example, only a portion of the vectors of the data structure 612 corresponding to HTTPS connections is used to generate the visual representation illustrated in FIG. 4. In an example, only a portion of the vectors of the data structure 612 corresponding to objects pending replication is used to generate the visual representation illustrated in FIG. 5.

The data structure 612 illustrates that data structures can include any number of values for each slot, allowing for efficient storage of parameters for each slot. In an example, a storage space for the data structure 612 is shown in Expression 1:

Metadata footprint=(slot_entry number*slot_entry size)+slot_number*accumulator_size)+fixed size of data structure  Expression 1:

In an example, the metadata footprint of the data structure 612 with 49 slot entries of 56 bytes each and 7 slots with accumulator sizes of 56 bytes each and a fixed size of 30 bytes is equal to 3,166 bytes. In this example, adding an additional parameter to the data structure 612 would add an additional 8 bytes to the slot entry size and an additional 8 bytes to the accumulator size to increase the metadata footprint by 448 bytes to a total of 3,614 bytes. Thus, each additional parameter adds a small amount to the overall metadata footprint and the data structure 612 occupies a small footprint (i.e., less than 10 KB). This small size for each additional parameter, as well as the small overall size of the data structure, allows for use of many different slots in the data structure, corresponding to many different time periods or ranges.

Figure 7:
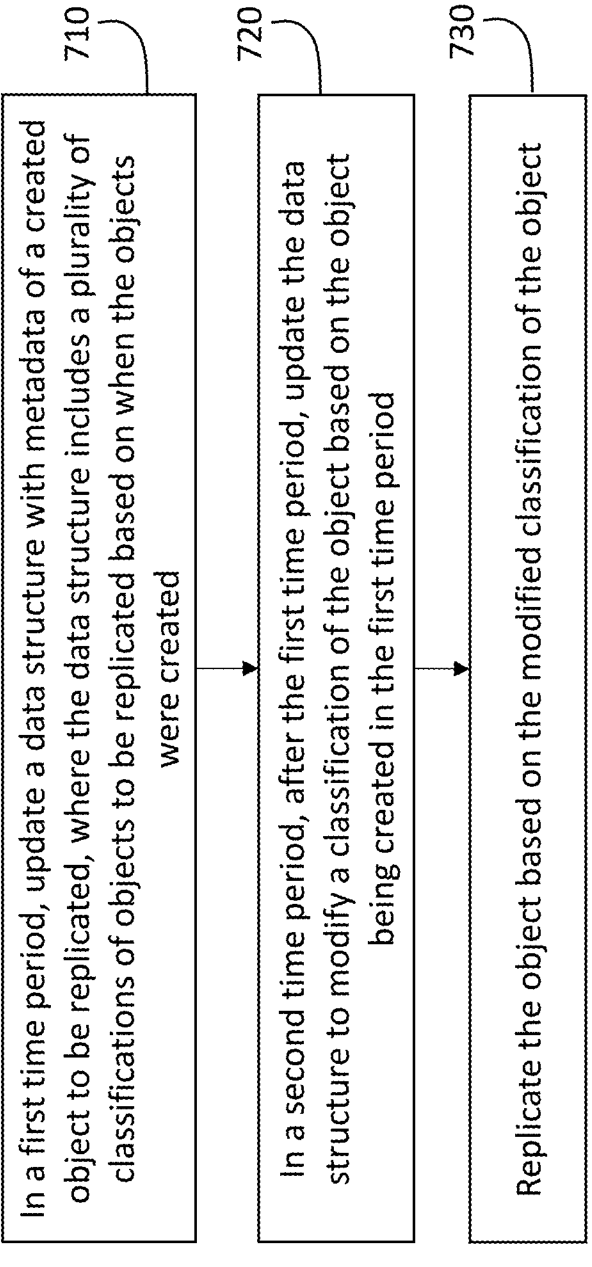
FIG. 7 illustrates operations of a flow chart of an example method for tracking objects pending replication in a source bucket.

FIG. 7 illustrates operations of a flow chart of an example method 700 for tracking objects pending replication in a source bucket. The method 700 may include more, fewer, or different operations than show. The operations may be performed in the order shown, in a different order, or concurrently. The method 700 may be performed by an object controller, such as the object controller 316 of FIG. 3.

At operation 710, in a first time period, a data structure is updated with metadata of a created object to be replicated, where the data structure includes a plurality of classifications of objects to be replicated based on when the objects were created. The data structure can be the data structure 512 of FIG. 5. The plurality of classifications of objects to be replicated based on when the objects were created can correspond to the plurality of time slots 514 for pending object count, where a classification corresponds to a slot of the plurality of time slots 514. The plurality of classifications of objects to be replicated can include classifications corresponding to time periods of varying lengths. In an example, the classifications correspond to time periods of increasing length. In an example, the classifications correspond to time periods having lengths of one second, ten seconds, one minute, ten minutes, one hour, six hours, one day, six days, one month, six months, and two years. In an example, the classifications include a classification corresponding to a most recent time period of less than ten minutes, less than one minute, or less than ten seconds.

At operation 720, in a second time period after the first time period, the data structure is updated to modify a classification of the object based on the object being created in the first time period. In this way, the object (i.e., metadata of the object) is added to the data structure based on the age of the object. In some implementations, the data structure is updated in the second time period to modify a classification of the object in response to a periodic update of the data structure. In an example, the data structure is updated every five minutes to move objects to new classifications according to the passage of time. In some implementations, the data structure is updated in the second time period to modify a classification of the object in response to creation of a second object. In an example, the data structure is updated each time an API call is received to create an object, where the data structure is updated based on a creation time of the object and/or a current time indicated in the API call. In an example, a time stamp of a current time in an API call is used to update a time stamp for each classification, causing the objects to be moved to different classifications based on creation time stamps of the objects.

At operation 730, the object is replicated based on the modified classification of the object. In some implementations, the object is replicated in a third time period after the second time period. In some implementations, the object is selected for replication based on the modified classification of the object. Selecting the object for replication can include determining an oldest classification including objects to be replicated, determining a time stamp corresponding to the oldest classification, and filtering the objects to be replicated based on the time stamp to select the objects of the oldest classification including the object.

In some implementations, the method 700 includes receiving user input to prioritize replication of older objects. The replication of the object based on the modified classification of the object can be based on the user input to prioritize replication of older objects, where the modified classification of the object is a classification corresponding to older objects. In an example, the modified classification is an oldest classification including objects, causing replication of the objects associated with the modified classification based on the user input to prioritize replication of older objects. In an example, the data structure is used to replicate a first set of objects before a second set of objects based on the first set of objects being created before the second set of objects. The data structure can track the creation of the first set of objects before the second set of objects by maintaining the metadata of the first set of objects in older classifications of the data structure than newer classifications in which the metadata of the second set of objects is maintained.

In some implementations, the method 700 includes generating a visual representation of the data structure that indicates a number of objects corresponding to each classification of the plurality of classifications. The visual representation can be a bar graph, a table, or any other visual representation. The data structure 512 illustrated in FIG. 5 is an example of a visual representation (table) of a data structure.

In some implementations, the method includes determining a most recent synchronization time for a first location of the object and a second location to which the object is replicated. The first location of the object may be a source bucket, such as the source bucket 310 of FIG. 3. The second location of the object may be a target bucket, such as the target bucket 320 of FIG. 3. The most recent synchronization time may be a last synchronization time, as discussed herein. The most recent synchronization time can be determined using the data structure by traversing the data structure from an oldest classification towards a youngest classification to determine an oldest classification including objects pending replication, indicating the most recent synchronization time. The time period corresponding to the oldest classification including objects pending replication indicates the most recent synchronization time. In some implementations, the most recent synchronization time can be determined using the data structure by querying the data structure to determine a newest classification that does not include objects pending replication. In an example, a classification corresponding to a day is the oldest classification including objects pending replication (i.e., pending objects) and the next oldest classification corresponds to two days, meaning that the last synchronization time is between one day and two days.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:

in a first time period, updating, by one or more processors, a data structure with metadata of a created object to be replicated from a source bucket to a target bucket, wherein the data structure includes a plurality of classifications of objects to be replicated based on when the objects were created, wherein the plurality of classifications correspond to time periods of increasing length;

in a second time period, after the first time period, updating, by the one or more processors, the data structure to modify a classification of the object based on the object being created in the first time period;

replicating, by the one or more processors, from the source bucket to the target bucket, the object based on the modified classification of the object; and determining, by the one or more processors, using the data structure, a most recent synchronization time between the source bucket and the target bucket based on an oldest classification of the plurality of classifications that includes objects pending replication.

2. The method of claim 1, wherein the data structure includes a first classification corresponding to objects created within a most recent time period of less than ten minutes.

3. The method of claim 1, further comprising receiving, by the one or more processors, user input to prioritize replication of older objects, wherein replicating, by the one or more processors, the object based on the modified classification of the object is based on the user input to prioritize replication of older objects.

4. The method of claim 1, further comprising replicating, by the one or more processors, based on the data structure, a first set of objects before a second set of objects based on the first set of objects being created before the second set of objects.

5. The method of claim 1, further comprising generating, by the one or more processors, a visual representation of the data structure, wherein the visual representation indicates a number of objects corresponding to each classification of the plurality of classifications.

6. The method of claim 1, wherein the one or more processors update the data structure in the second time period to modify a classification of the object in response to creation of a second object.

7. The method of claim 6, wherein the data structure is updated each time an API call is received to create an object, wherein the data structure is updated based on a creation time of the object and a current time indicated in the API call.

8. The method of claim 1, wherein replicating the object based on the modified classification comprises determining an oldest classification of the plurality of classifications that includes objects to be replicated, determining a time stamp corresponding to the oldest classification, and filtering objects to be replicated based on the time stamp to select objects of the oldest classification for replication.

9. An apparatus, comprising:

one or more processors; and a non-transitory, computer-readable medium including instructions which, when executed by the one or more processors, cause the one or more processors to:

in a first time period, update a data structure with metadata of a created object to be replicated from a source bucket to a target bucket, wherein the data structure includes a plurality of classifications of objects to be replicated based on when the objects were created, wherein the plurality of classifications correspond to time periods of increasing length;

in a second time period, after the first time period, update the data structure to modify a classification of the object based on the object being created in the first time period;

replicate, from the source bucket to the target bucket, the object based on the modified classification of the object; and determine, using the data structure, a most recent synchronization time between the source bucket and the target bucket based on an oldest classification of the plurality of classifications that includes objects pending replication.

10. The apparatus of claim 9, wherein the data structure includes a first classification corresponding to objects created within a most recent time period of less than ten minutes.

11. The apparatus of claim 9, further comprising receiving, by the one or more processors, user input to prioritize replication of older objects, wherein replicating, by the one or more processors, the object based on the modified classification of the object is based on the user input to prioritize replication of older objects.

12. The apparatus of claim 9, further comprising replicating, by the one or more processors, based on the data structure, a first set of objects before a second set of objects based on the first set of objects being created before the second set of objects.

13. The apparatus of claim 9, further comprising generating, by the one or more processors, a visual representation of the data structure, wherein the visual representation indicates a number of objects corresponding to each classification of the plurality of classifications.

14. The apparatus of claim 9, wherein the one or more processors update the data structure in the second time period to modify a classification of the object in response to creation of a second object.

15. The apparatus of claim 14, wherein the data structure is updated each time an API call is received to create an object, wherein the data structure is updated based on a creation time of the object and a current time indicated in the API call.

16. The apparatus of claim 9, wherein replicating the object based on the modified classification comprises determining an oldest classification of the plurality of classifications that includes objects to be replicated, determining a time stamp corresponding to the oldest classification, and filtering objects to be replicated based on the time stamp to select objects of the oldest classification for replication.

17. A non-transitory, computer-readable medium including instructions which, when executed by one or more processors, cause the one or more processors to:

in a first time period, update a data structure with metadata of a created object to be replicated from a source bucket to a target bucket, wherein the data structure includes a plurality of classifications of objects to be replicated based on when the objects were created, wherein the plurality of classifications correspond to time periods of increasing length;

in a second time period, after the first time period, update the data structure to modify a classification of the object based on the object being created in the first time period;

replicate, from the source bucket to the target bucket, the object based on the modified classification of the object; and determine, using the data structure, a most recent synchronization time between the source bucket and the target bucket based on an oldest classification of the plurality of classifications that includes objects pending replication.

18. The non-transitory, computer-readable medium of claim 17, wherein the data structure includes a first classification corresponding to objects created within a most recent time period of less than ten minutes.

19. The non-transitory, computer-readable medium of claim 17, further comprising receiving, by the one or more processors, user input to prioritize replication of older objects, wherein replicating, by the one or more processors, the object based on the modified classification of the object is based on the user input to prioritize replication of older objects.

20. The non-transitory, computer-readable medium of claim 17, further comprising replicating, by the one or more processors, based on the data structure, a first set of objects before a second set of objects based on the first set of objects being created before the second set of objects.

21. The non-transitory, computer-readable medium of claim 17, further comprising generating, by the one or more processors, a visual representation of the data structure, wherein the visual representation indicates a number of objects corresponding to each classification of the plurality of classifications.

22. The non-transitory, computer-readable medium of claim 17, wherein the one or more processors update the data structure in the second time period to modify a classification of the object in response to creation of a second object.

23. The non-transitory, computer-readable medium of claim 22, wherein the data structure is updated each time an API call is received to create an object, wherein the data structure is updated based on a creation time of the object and a current time indicated in the API call.

24. The non-transitory, computer-readable medium of claim 17, wherein replicating the object based on the modified classification comprises determining an oldest classification of the plurality of classifications that includes objects to be replicated, determining a time stamp corresponding to the oldest classification, and filtering objects to be replicated based on the time stamp to select objects of the oldest classification for replication.

* * * * *